United States Patent [19]
Dobbin et al.

[11] Patent Number: 5,632,647
[45] Date of Patent: May 27, 1997

[54] RF/POWER TAP

[75] Inventors: Donald P. Dobbin, Clark; Theodore E. Kluska, Glen Rock; Arnold R. Smith, Chester, all of N.J.

[73] Assignee: Lucent Technologies Inc., Murray Hill, N.J.

[21] Appl. No.: 324,307

[22] Filed: Oct. 17, 1994

[51] Int. Cl.⁶ .................................................. H01R 13/52
[52] U.S. Cl. ........................... 439/521; 439/465; 439/718
[58] Field of Search .................................. 439/521, 522, 439/718, 719, 709, 142, 144, 465, 466, 467, 942

[56] References Cited

U.S. PATENT DOCUMENTS

| | | |
|---|---|---|
| 2,431,999 | 12/1947 | Engelhardt ........................... 439/718 |
| 3,798,587 | 3/1974 | Ellis, Jr. . | |
| 4,153,326 | 5/1979 | Frantz et al. ........................ 439/465 |
| 4,729,059 | 3/1988 | Wang ................................... 439/709 |
| 4,731,501 | 3/1988 | Clark et al. ......................... 439/718 |
| 5,058,198 | 10/1991 | Rocci et al. . | |
| 5,186,661 | 2/1993 | Capper ................................. 439/521 |

FOREIGN PATENT DOCUMENTS 4005086  8/1991  Germany ................ 439/682

*Primary Examiner*—Hien Vu
*Attorney, Agent, or Firm*—Lester H. Birnbaum

[57] ABSTRACT

Disclosed is a combined RF/power tap unit. The power and RF portions are provided in separate compartments with a cover for the power compartment so that access to the internal RF circuitry is possible without disturbing the power compartment. The cover for the power portion extends beyond the sides of the compartment, and the compartment includes appropriate grooves and seals to protect the wire connections from the outside environment. Detents are provided in one side of the compartment to hold the drop wires, and ribs in the cover supply strain relief.

9 Claims, 4 Drawing Sheets

RF/POWER TAP

BACKGROUND OF THE INVENTION

This invention relates to radio frequency/power taps.

In typical CATV systems, radio frequency (RF) signals are transmitted from the head end to near a customer's premises on a coaxial cable. In some cases, power may be added to the cable. (See e.g., U.S. Pat. No. 5,058,198 issued to Rocci et al.) In some systems it is desired to also deliver power to the customer's premises. Since utility code regulations sometimes prohibit power and RF signals from being brought to the home on the same coaxial wire, the two are separated at a tap which is located at the main distribution cable typically on a pole, a pedestal, or in a hand hole.

Since the tap is located outdoors, it is important to protect the wire connections from the environment. It is also desirable to provide continued protection for the power wire connections even while a craftsperson is working on the RF connections or vice versa.

SUMMARY OF THE INVENTION

The invention is a tap unit including means for receiving and separating power and RF signals to a plurality of customers. The unit has a first compartment for housing RF connections and a second compartment for housing power wire connections, and separate covers over the compartments. One side of the power compartment includes a series of detents for receiving and holding wires coupled to the power wire connections. The cover over the power compartment extends beyond the side and includes a series of scallops aligned with the detents.

BRIEF DESCRIPTION OF THE DRAWING

These and other features of the invention are delineated in detail in the description to follow. In the drawing.

It will be appreciated that, for purposes of illustration, these figures are not necessarily drawn to scale.

DETAILED DESCRIPTION

Figure 1:
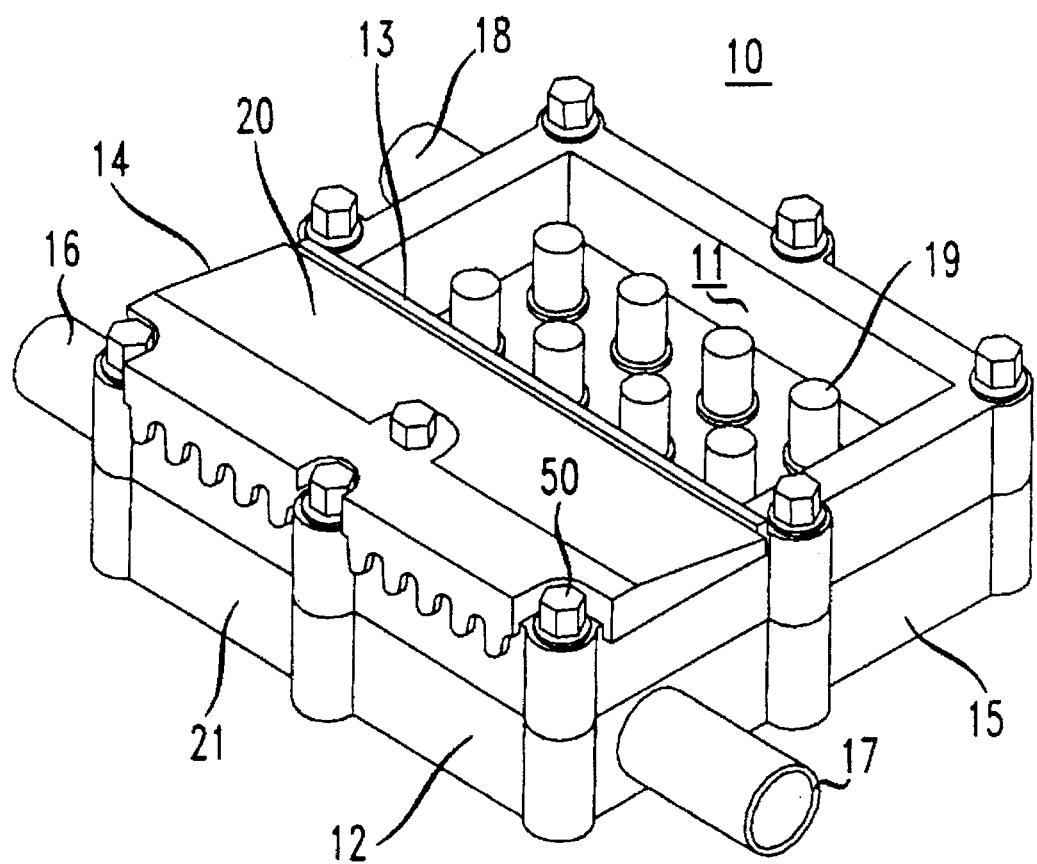
FIG. 1 is a perspective view of a tap unit in accordance with an embodiment of the invention.
Figure 2:
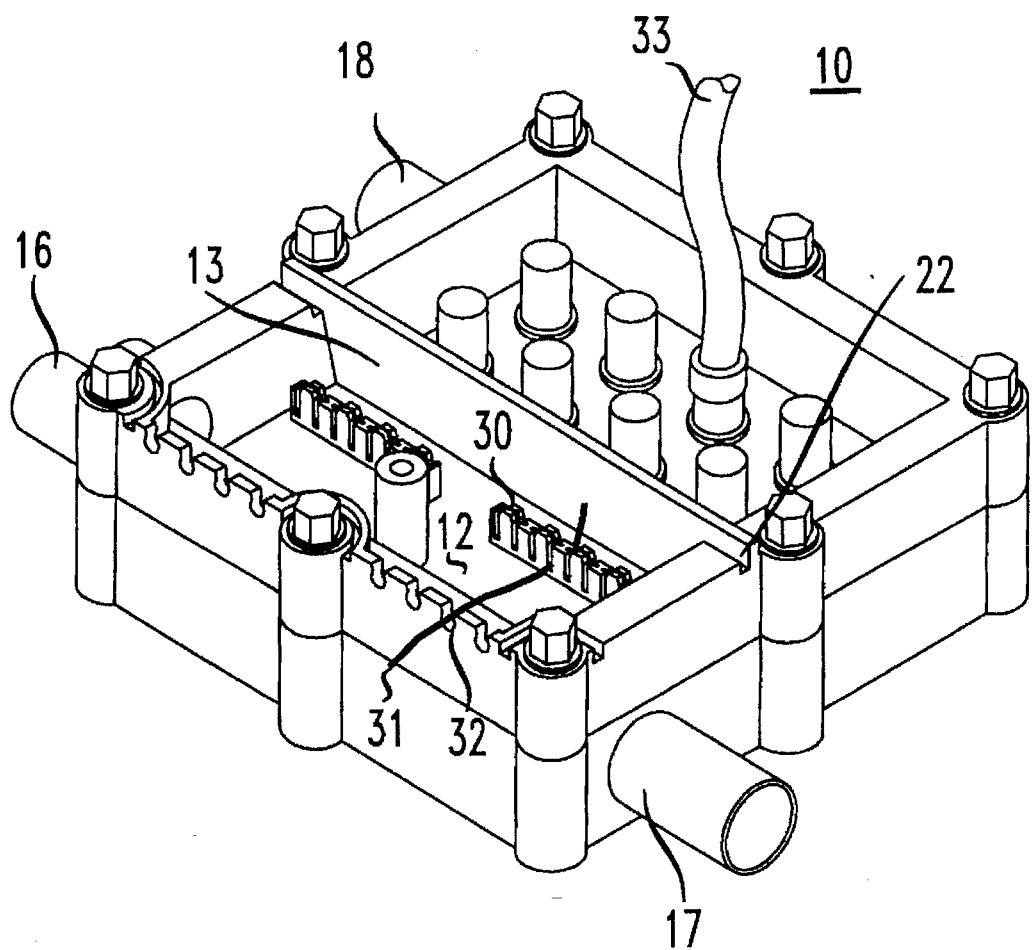
FIG. 2 is a perspective view of the same unit with the cover removed from the power compartment.

As illustrated in FIGS. 1 and 2, the tap unit, 10, in accordance with one embodiment, comprises two compartments, 11 and 12, separated by an internal wall, 13. One exterior wall, 14, of the unit, 10, includes a port, 16, for receiving an incoming cable (not shown) including power and RF signals. Two output ports, 17 and 18, are provided for the exit of the cable, one in the same wall, 14, of the input port, 16, and the other on the opposite wall, 15, of the unit. In the event that the unit is aerial-mounted, 17 is used as the output port, while 18 is used as the output port for a pedestal mounting.

The unit, 10, actually comprises two separable, vertically mounted bodies which are held together by a plurality of fasteners, e.g., 50, which can be standard hex nuts. The walls of the bodies are typically made of a metal such as aluminum.

One of the compartments, 11, includes therein a plurality of RF connection ports, e.g., 19, for providing RF coupling to the customers connected to the tap, 10, by means of individual cables, e.g., 33, coupled to each port. Since the RF coupling portion is fairly standard, it will not be discussed in detail.

Figure 4:
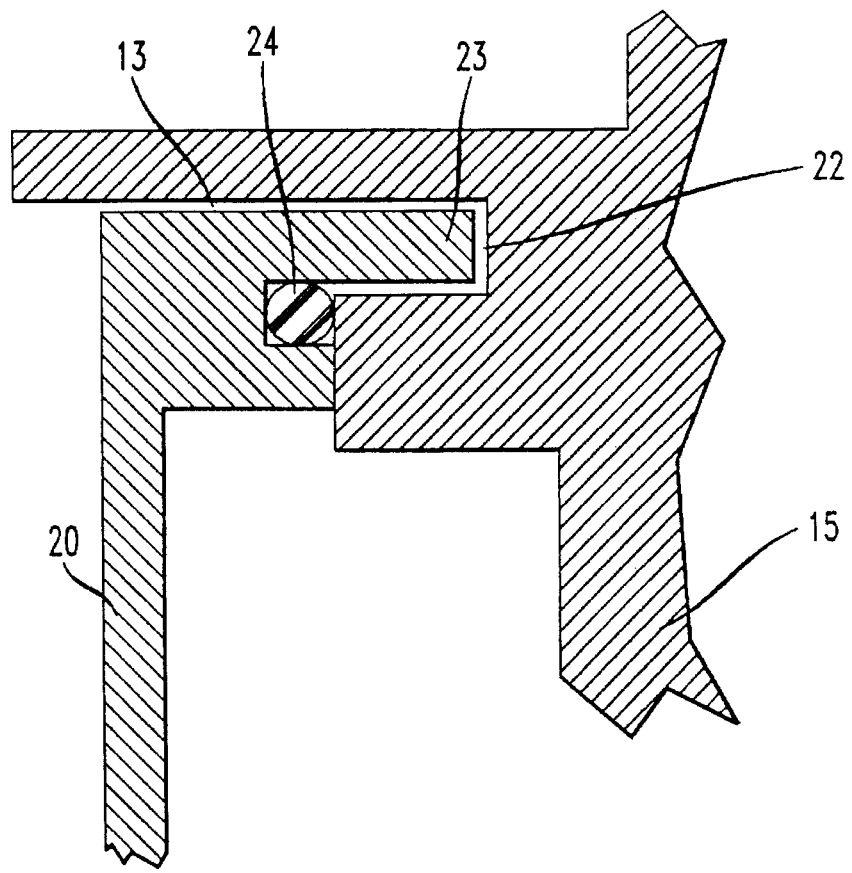
FIG. 4 is a enlarged cross-sectional view of a portion of the unit shown in FIGS. 1 and 2.

The adjacent compartment, 12, includes a cover, 20, which is separate from the 2-part main body, so that a craftsperson can work on the RF portion of the tap while the power compartment, 12, is protected from the environment. It will be noted that the cover, 20, extends beyond the edges of the side walls, 14 and 15, and the front wall, 21, to provide enhanced protection of the compartment. As illustrated in FIGS. 2 and 4, the corners of the side and front walls of compartment, 12, include grooves, e.g., 22, into which are positioned flanges, e.g., 23, at the corners of the cover, 20, when the cover is placed over the compartment. As best seen in FIG. 4, where a portion of the tap is shown in the vertical mounting position, the combination of internal wall, 13, and tongue-in-groove fit of the cover, 20, produces a rainproof enclosure for the compartment, 12. To further enhance the protection of the compartment, a flexible gasket, 24, can also be provided adjacent to the cover flange, e.g., 23.

As illustrated in FIG. 2, the compartment, 12, includes sets, e.g., 30, of insulation displacement contacts. In this particular example, the contacts take the form of standard 110-type contacts. (See, e.g., U.S. Pat. No. 3,798,587 issued to Ellis, Jr. et al.) However, it should be realized that other types of contacts can be used with the invention. The contacts, 30, on one end provide electrical connection to power wires, e.g., 44 and 45 of FIG. 5, which are coupled to a printed circuit board, 43 of FIG. 5. The printed circuit board, 43, resides in the bottom portion of the unit under the compartments 11 and 12 and is also electrically coupled to the incoming cable (not shown). The opposite end of the contacts, 30, provide electrical connection to the drop wires going to the customer's premises, only one of which is shown as wire 31 in FIG. 2 for purposes of clarity in the illustration. Each drop wire, e.g. 31, is positioned in a corresponding detent, e.g., 32, formed in the top edge of the front wall, 21, of the compartment, 12.

Figure 3:
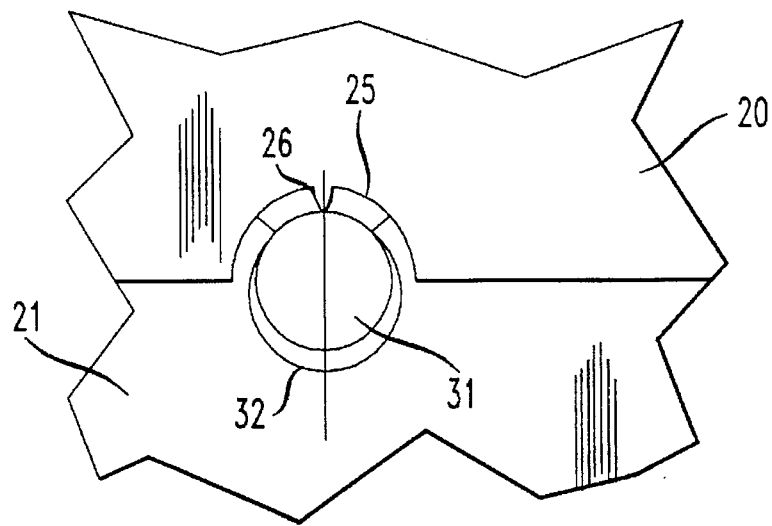
FIG. 3 is an enlarged view of a portion of the unit of FIGS. 1 and 2.

As further illustrated in FIG. 3, when the cover, 20, is placed over the compartment, 12, each groove, e.g., 25, in the scalloped edge of the front surface of the cover is placed over a corresponding drop wire, e.g., 31. It will be noted that each groove, e.g., 25, in the cover includes a rib, e.g., 26, extending therefrom which makes mechanical contact with its associated drop wire, e.g., 31, to provide strain relief for the wire. Additional strain relief is supplied due to the fact that the cover, 20, extends beyond the front surface of the compartment, 12.

Figure 5:
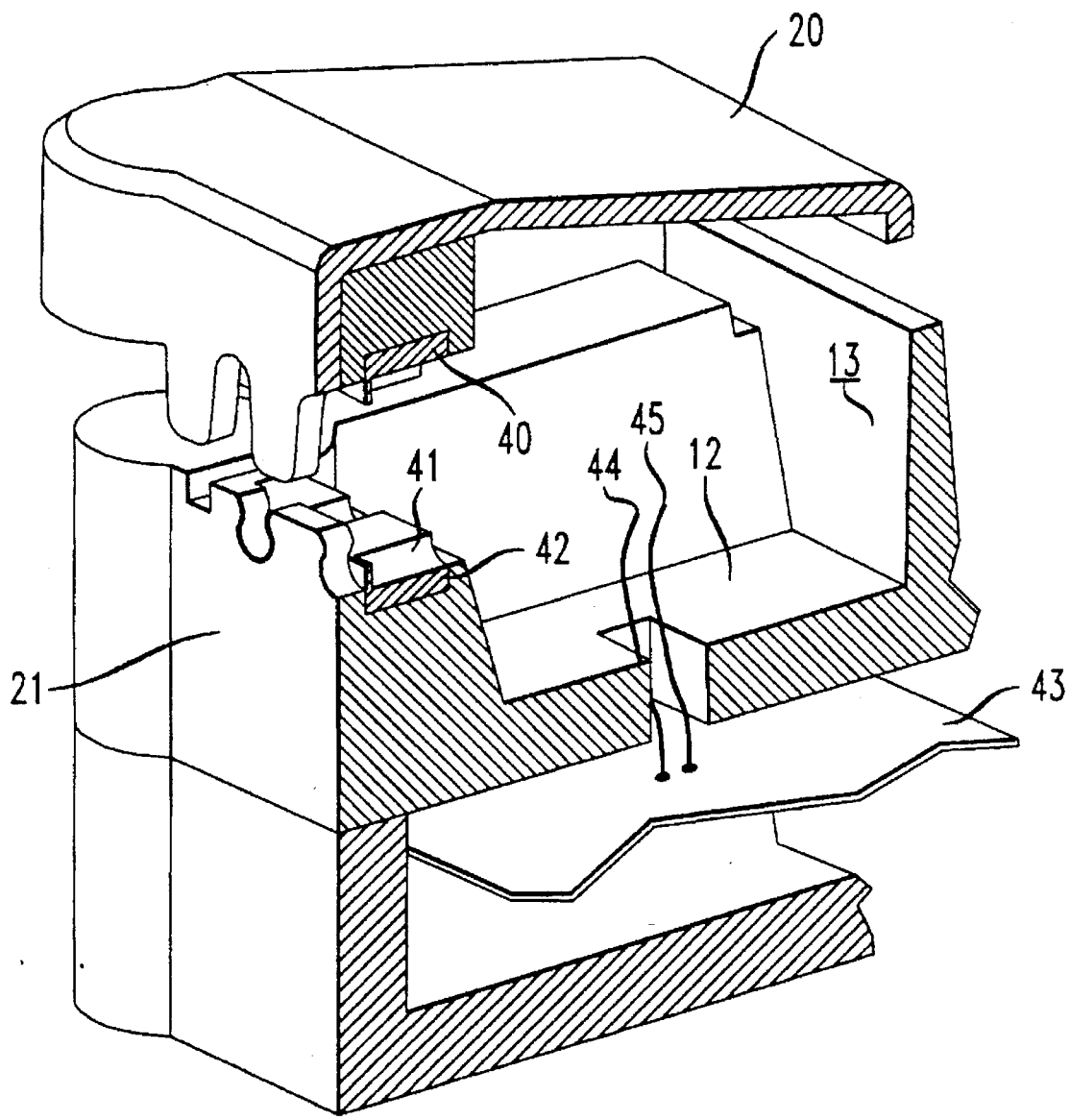
FIG. 5 is an enlarged cross-sectional view of a further portion of the unit shown in FIGS. 1 and 2.

As shown in FIG. 5, the wires are sealed with a split gasket, one half, 40, being in the cover, 20, and one half, 41, being in a pocket, 42, in the housing. The gasket may be either a soft foam which conforms to each drop wire or it may contain preformed holes, in which case unused holes can be sealed via a thin membrane over either the inside or outside edge or with separate plugs.

It should be appreciated that another advantage of the unit, 10, is the fact that the upper body can be completely removed from the lower body to provide access to the circuitry, e.g., circuit board 43, in the lower body without having to disconnect and then reconnect the drop wires, e.g., 31, or remove the cover, 20, so that the drop wire connections remain protected from the environment.

Various modifications will become apparent to those skilled in the art. All such variations which basically rely on the teachings through which the invention has advanced the art are properly considered within the scope of the invention.

We claim:

1. An electrical tap unit comprising:

a housing having a first compartment and a second compartment;

port means for receiving a cable transmitting power and RF signals, and means for providing the power and RF signals on separate wires to each of a plurality of customers;

said first compartment housing RF connections;

said second compartment housing a power wire connection;

a bottom portion containing a circuit board for connecting to the power wire connection;

at least one detent formed in a least one wall of the second compartment and aligned with the power wire connection so that the detent receives a wire which is electrically connected to the power wire connection; and means attached to a top portion of said tap unit for covering the second compartment only so that the RF connections can be repaired while keeping the power wire connections protected from the environment said means including a cover with at least one side which extends beyond said at least one wall of the second compartment and includes at least one scallop aligned with the detent.

2. An electrical tap unit according to claim 1 wherein the cover further comprises at least one rib located in the scallop for making mechanical contact with the wire in the detent.

3. An electrical tap unit according to claim 1 wherein a second wall is an interior wall to the unit and separates the compartments.

4. An electrical tap unit according to claim 3 wherein the second compartment includes third and fourth walls extending transversely from said interior wall and including grooves formed on top surfaces of the third and fourth walls adjacent to the interior wall.

5. An electrical tap unit according to claim 4 wherein the cover includes a flange which fits within the grooves so that the interior wall and cover provide an essentially rainproof protection for the power wire connection in the second compartment.

6. An electrical tap unit according to claim 5 wherein the cover further includes a flexible gasket adjacent to the flange.

7. An electrical tap unit according to claim 4 wherein the third and fourth walls form corners with the first wall, and grooves are also formed on the top surfaces of the walls at said corners.

8. An electrical tap unit according to claim 1 wherein said top portion being removable without disconnecting the wire from the power wire connection.

9. An electrical tap unit according to claim 1 wherein the second compartment includes a plurality of power wire connections and the wall of the second compartment includes a plurality of detents, each detent being aligned with a corresponding power wire connection, such that each detent receives a separate wire electrically connected to a corresponding power wire connection.

* * * * *